United States Patent
Chang et al.

(10) Patent No.: US 7,239,791 B1
(45) Date of Patent: Jul. 3, 2007

(54) UNIFORM LIGHT GUIDE MECHANISM

(75) Inventors: Jung-Wen Chang, Tao Yuan Shien (TW); Wen-Ji Tsai, Hsinchuang (TW); Wan-Chi Lin, Taichung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/524,323

(22) Filed: Sep. 21, 2006

(30) Foreign Application Priority Data

Jun. 28, 2006 (TW) .............................. 95211322 U

(51) Int. Cl.
*G02B 6/10* (2006.01)
(52) U.S. Cl. .................................... 385/146
(58) Field of Classification Search ................ 385/146, 385/901
See application file for complete search history.

(56) References Cited

U.S. PATENT DOCUMENTS 6,426,807 B1 * 7/2002 Kawai et al. ............... 358/484

* cited by examiner

*Primary Examiner*—Sung Pak
*Assistant Examiner*—Daniel Petkovsek
(74) *Attorney, Agent, or Firm*—Rabin & Berdo, PC

(57) ABSTRACT

A light guide mechanism includes a surface member, a bottom member, a connecting member and a light source. The connecting member is used to connect the surface member and the bottom member. The bottom member has a first side and a second side, and the light source faces the first side and is separated from the first side by a distance of 11 mm~15 mm. The light source is also separated from the top surface by a distance of 10 mm~15 mm. The first side is covered by a diffusion material to diffuse the light from the light source and the second side is covered by an aluminum material to prevent the light source from being diffused.

5 Claims, 3 Drawing Sheets

UNIFORM LIGHT GUIDE MECHANISM

RELATED APPLICATIONS

The present application is based on, and claims priority from, Taiwan Application Serial Number 95211322, filed Jun. 28, 2006, the disclosure of which is hereby incorporated by reference herein in its entirety.

BACKGROUND

1. Field of Invention

The present invention relates to a light guide mechanism. More particularly, the present invention relates to a uniform light guide mechanism.

2. Description of Related Art

Light guide mechanisms are used in various electronic devices such as computer devices or docking devices to indicate the operating status; for example, whether a hard drive is transmitting data or not and whether the wireless function is working right now or not. In FIG. 1, a base 11 of a conventional notebook is shown. The base 11 has a first light guide mechanism 12 and a second light guide mechanism 13 that indicate, for example, whether the AC power is plugged in or not, whether the wireless function is working right now or not and whether the hard drive is transmitting data or not.

The disadvantage of most conventional light guide mechanisms is that they have non-uniform light guides (i.e. an obvious bright spot is seen from outside the light guide mechanism). It is difficult to design a well lit guide mechanism in a small, short, thin electronic device. Another reason is that the light source is usually set directly behind the light guide. The traditional solution usually adopts a specific material such as partly acrylic and partly diffusion material to overcome the disadvantage; however, the forgoing methods would increase the cost.

SUMMARY

It is therefore an aspect of the present invention to provide a uniform light guide mechanism comprising a surface member, a bottom member, a connecting member and a light source. The bottom member has a first side and a second side, and the connecting member is used to connect the surface member with the bottom member. The light source faces the first side and is separated from the first side by a distance of 11 mm~15 mm. The light source is also separated from the top surface member by a distance of 10 mm~15 mm. Because the light guide is not set behind the light guide mechanism directly as the traditional light guide mechanism, there is no obvious visible bright spot. The light emitted from the light guide is uniform.

The first side is covered by a diffusion material to diffuse the light from the light source, and the second side is covered by an aluminum material to prevent the light source from diffusing light. The uniformity of the light guide could be improved if a fogging process such as sand blasting, embossing or lacquer is applied to the surface of the surface member 110.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
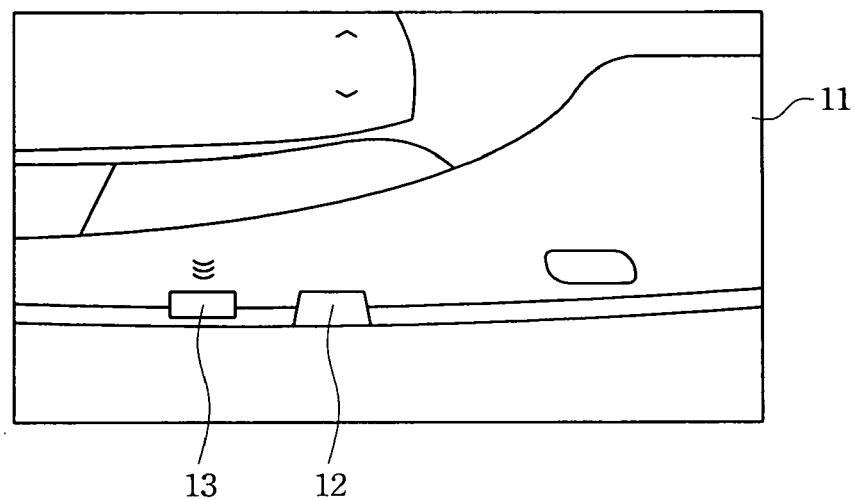
FIG. 1 is a schematic diagram of a light guide mechanism of a conventional computer device.
Figure 2:
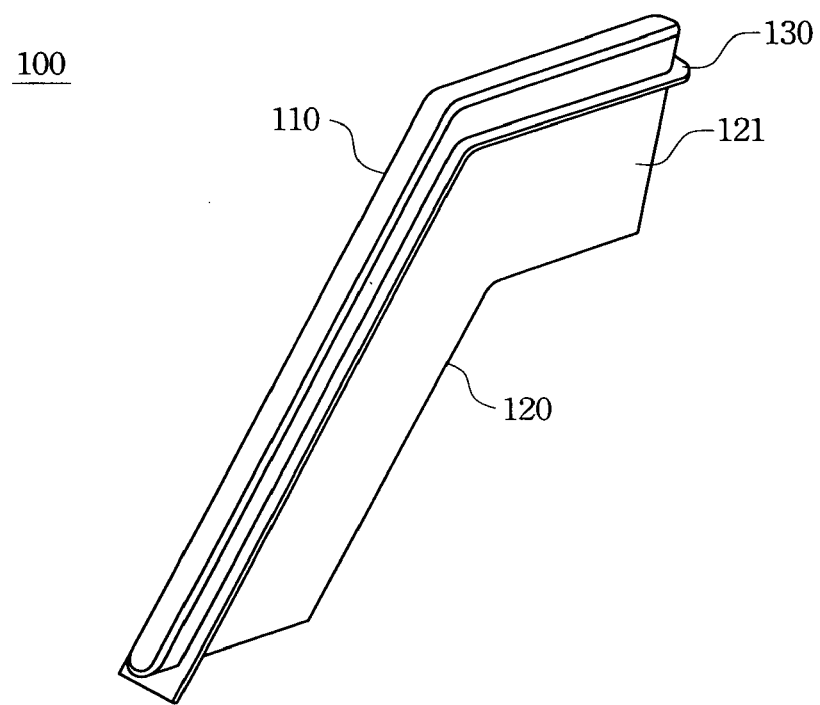
FIG. 2 is a schematic diagram of a light guide mechanism in accordance with a preferred embodiment of the present invention.

FIG. 2 shows a schematic diagram of a light guide mechanism 100 in accordance with a preferred embodiment of the present invention. In FIG. 2, the light guide mechanism 100 is used in an electronic device such as a notebook or a docking device. The light guide mechanism 100 comprises a surface member 110 with a first side 121 and a second side (not shown) whose positions are opposite to each other, a bottom member 120, and a connecting member 130. The surface member 110 is the member being viewed by the user and the bottom member 120 may be set in the electronic device where the user cannot see it directly. The connecting member 130 connects the surface member 110 and the bottom member 120 together.

Figure 3:
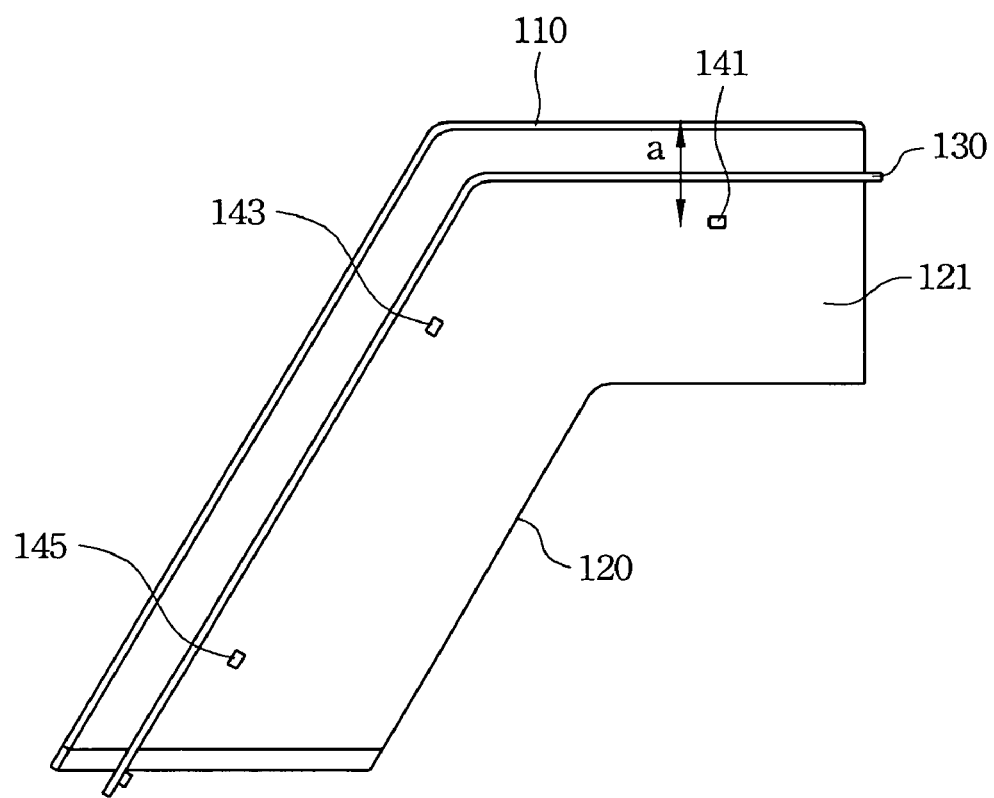
FIG. 3 is side view of a light guide mechanism in accordance with a preferred embodiment of the present invention.
Figure 4:
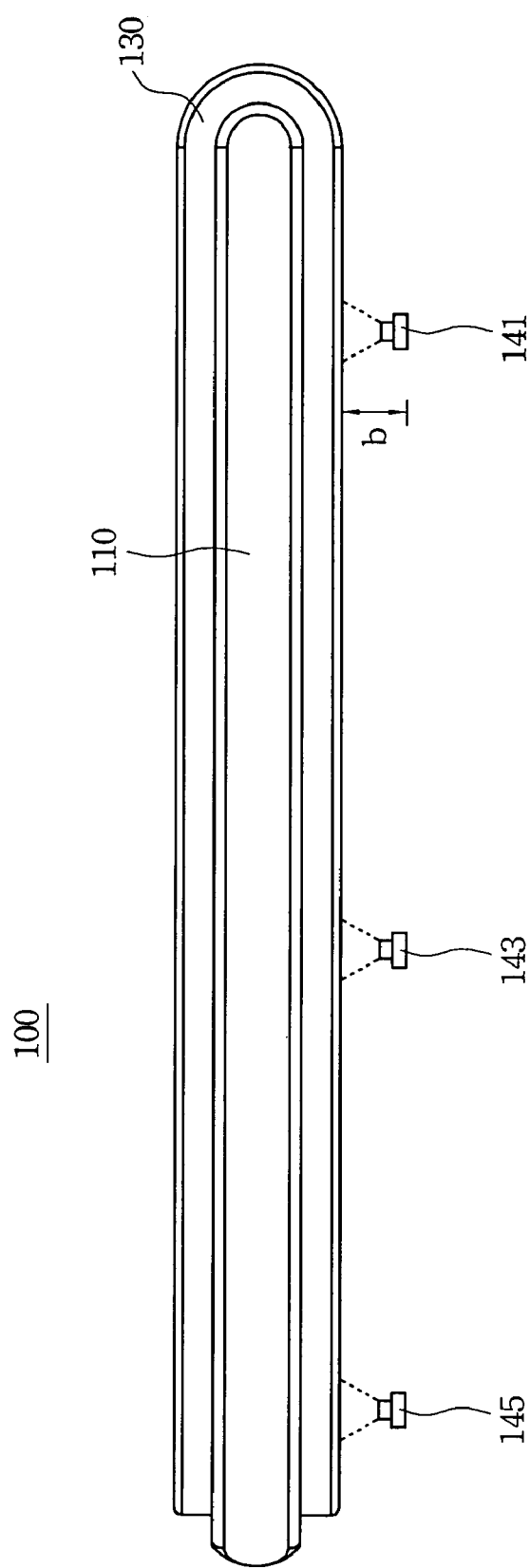
FIG. 4 is a top view of a light guide mechanism in accordance with a preferred embodiment of the present invention.

Refer to FIG. 3 and FIG. 4. FIG. 3 and FIG. 4 show the side view and the top view of the light guide mechanism 100. In FIG. 4, the light sources 141, 143 and 145 (for example, diodes) face the first side 121 and are set at a distance "b" between 11 mm~15 mm from the first side 121. Apart from the separation distance "b", a distance "a" (10 mm~15 mm) between the top of the surface member 110 and the light sources 141, 143 and 145 is adjusted to within 10 mm~15 mm as shown in FIG. 3. Because the light sources 141, 143 and 145 are not set directly behind the light guide mechanism 100 but by the side of the light guide mechanism 100, there is no obvious observable bright spot.

To improve the uniformity of the light guide effect, the first side 121 could be covered by a diffusion material to diffuse the light of the light sources 141, 143 and 145, and the second side could be covered by an aluminum material to prevent light from being diffused. Furthermore, a fogging process (such as sand blasting, embossing or lacquer) could be applied on the surface of the surface member 110 to enhance a uniform effect.

The number of light sources is not limited to 3 as shown in the foregoing embodiment but depends on the electronic device. In addition, the position of the light sources 141, 143 and 145 are not limited to the first side 121. Light sources may also be placed on the second side. Light sources may even be placed on both sides of the surface member 110. Notice that if the light sources 141, 143 and 145 are set on the second side, the diffusion material and the aluminum material would be switched to cover the second side and the first side 121, respectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guide mechanism, comprising:
   a surface member subjected to a fogging process;
   a bottom member with a first side by a diffusion material and a second side covered by an aluminum material;
   a connecting member for connecting the surface member and the bottom member; and
   at least one light source;
   wherein the light source faces the first side, and the light source is set within a distance of 11 mm~15 mm from the first side; and within a distance of 10 mm~15 mm from a top of the surface member.

2. The light guide mechanism as claimed in claim 1, wherein the light source is a diode.

3. The light guide mechanism as claimed in claim 1, wherein the fogging process is sand blasting.

4. The light guide mechanism as claimed in claim 1, wherein the fogging process is embossing.

5. The light guide mechanism as claimed in claim 1, wherein the fogging process is a lacquer.

* * * * *